United States Patent [19]

Lucas et al.

[11] Patent Number: 5,698,653
[45] Date of Patent: Dec. 16, 1997

[54] NON-CORROSIVE TRANSLUCENT RTV COMPOSITIONS

[75] Inventors: Gary M. Lucas; Jeffrey H. Wengrovius, both of Scotia, N.Y.

[73] Assignee: General Electric Company, Pittsfield, Mass.

[21] Appl. No.: 644,791

[22] Filed: May 10, 1996

[51] Int. Cl.$^6$ .................................................. C08C 77/04
[52] U.S. Cl. ............................. 528/17; 524/863; 524/868; 524/731; 528/34
[58] Field of Search .................. 528/17; 524/863, 524/868, 731

[56] References Cited

U.S. PATENT DOCUMENTS

| | | |
|---|---|---|
| 3,065,194 | 11/1962 | Nitzsche et al. . |
| 3,340,067 | 9/1967 | Weyenberg . |
| 3,542,901 | 11/1970 | Cooper et al. . |
| 3,689,454 | 9/1972 | Smith et al. . |
| 3,779,986 | 12/1973 | Smith et al. . |
| 4,257,932 | 3/1981 | Beers . |
| 4,505,209 | 3/1985 | Strohmeyer, Jr. . |
| 4,515,932 | 5/1985 | Chung . |
| 4,528,353 | 7/1985 | Lucas et al. . |
| 4,563,498 | 1/1986 | Lucas . |
| 4,593,085 | 6/1986 | Lucas . |
| 4,670,532 | 6/1987 | Lucas . |
| 4,755,578 | 7/1988 | Lucas . |
| 4,797,446 | 1/1989 | Dietein .................... 528/17 |
| 4,863,992 | 9/1989 | Wengrovius et al. . |
| 4,863,993 | 9/1989 | Montgomery . |
| 4,895,918 | 1/1990 | Lucas . |
| 5,166,296 | 11/1992 | Wengrovius et al. . |
| 5,286,766 | 2/1994 | Arai et al. ................ 523/213 |

*Primary Examiner*—Ralph H. Dean
*Attorney, Agent, or Firm*—Kenneth S. Wheelock

[57] ABSTRACT

A non-corrosive translucent room temperature vulcanizable silicone composition consists essentially of an alkyl alkoxy stopped diorganopolysiloxane, a polyalkoxysilane crosslinking agent and a tetra alkyl titanate condensation cure catalyst.

9 Claims, No Drawings

5,698,653

1

NON-CORROSIVE TRANSLUCENT RTV COMPOSITIONS

FIELD OF THE INVENTION

The present invention relates to room temperature vulcanizable silicone sealant compositions that are colorless, translucent, and non-corrosive.

BACKGROUND OF THE INVENTION

The combination of polyalkoxy terminated polydimethylsiloxane (polydimethylsiloxane) polymers, reinforcing fumed silica fillers, polyalkoxysilane crosslinking agents, and condensation cure catalysts can be combined to yield translucent, shelf-stable, fast curing, one and two-part room temperature vulcanizable sealants. The condensation catalysts utilized in these formulations are typically various dialkyl metal chelates, particularly the chelating carboxylic acid salts of those metals. These sealants have the improved property of being less corrosive relative to room temperature vulcanizable silicone compositions that make use of an alkoxy curing mechanism.

The term stable, in referring to one-part polyalkoxy terminated organopolysiloxane room temperature vulcanizable compositions, has typically been taken to mean a moisture curable mixture capable of remaining substantially unchanged while excluded or protected from atmospheric moisture that cures to a tack free elastomer when exposed to atmospheric moisture. Additionally, the term stable also means that the tack free time exhibited by freshly mixed room temperature vulcanizable sealants will be independent of storage time at ambient conditions. An accelerated shelf stability test measures this property by heating such a composition at 70° C. for 5 days. Compositions that exhibit similar tack free times after being subjected to this accelerated shelf stability test are considered stable.

The term non-corrosive refers to a particular specification and test protocols designed to qualify room temperature vulcanizable silicone compositions for military specification Mil-A46146B. Briefly one test involves extruding a known weight of the silicone composition into a test jar, covering the silicone with water and suspending corrosion test coupons of brass steel and aluminum in the water that is in contact with the silicone. The procedure is repeated without the silicone as a control. The jars are maintained at 100°±3.6° F. for a period of 168±4 hours (7 days). Silicone samples that discolor or corrode the test coupons are considered to have failed the test. A similar test involves testing copper wire that is encapsulated in the test silicone curing the encapsulated wire for 168±4 hours at 50±5% relative humidity at 23° C. and aging the encapsulated wire at 120°±2° F. in 95–98% relative humidity for 28 days. Any showing of corrosion relative to a control indicates failure.

An improved, low odor, substantially non-corrosive one part room temperature vulcanizable composition is disclosed in U.S. Pat. No. 4,257,932. The reduction in odor and corrosive properties, relative to one part room temperature vulcanizable silicone compositions that cure by releasing acetic acid, was achieved by utilizing as a crosslinking silane, a less volatile acidic leaving group such as methyl-tris-(2-ethylhexanoxy)silane. The use of methyl-tris-(2-ethylhexanoxy)silane is commonly referred to as an octoate curing system. The octanoic acid released by the curing process in this composition is not volatile, hence the low odor, but it does still corrode metals on contact.

U.S. Pat. No. 3,065,194 discloses a mixture of a hydroxy or alkoxy endstopped polydimethylsiloxane polymer, inert filler, ethylorthosilicate and dibutyl tin dilaurate are curable upon contact with water or moisture. These compositions suffer from an apparent reduced shelf life of only fourteen days.

Other attempts to develop translucent, fast curing, non-corrosive one-part room temperature vulcanizable silicone sealants involved compositions comprising polyalkoxysilane crosslinking agents with silanol terminated polydimethylsiloxane polymers that utilize titanium chelate catalysts instead of tin catalysts (U.S. Pat. Nos. 3,334,067; 3,542,901; 3,689,454; and 3,779,986). These compositions typically possess a shelf life no greater than seven days.

The beta-diketonate dialkyl tin compounds have been employed in conjunction with a scavenger free polyalkoxy terminated polydimethylsiloxane polymer and polyalkoxy crosslinking agent to yield colorless, translucent, shelf-stable one-part room temperature vulcanizable compositions (U.S. Pat. Nos. 5,166,296 and 4,863,993). In these compositions, shelf stability is maximized when the tin catalyst is dibutyl tin di-acetylacetonate, although the composition is somewhat opaque and slightly yellow. The acetylacetone in the formulation results in the corrosion or discoloration of copper and brass substrates. Compositions that are free of the offending acetylacetone utilizing for example ethylacetoacetate do produce non-corrosive room temperature vulcanizable compositions, however these compositions are not particularly shelf stable and must be used quickly. Tin catalysts that contain substituted acetylacetonate as the chelating agent will undergo ligand exchange in the presence of free methanol, forming tin methoxy complexes that act as polydimethylsiloxane equilibration catalysts. This presents a problem because the catalyzed equilibration results in the formation of dimethyl mono-alkoxy terminated polydimethylsiloxane polymers which do not cure.

A process for endcapping polydimethylsiloxane to form the polyalkoxy endstopping groups necessary for crosslinking utilizes a Lewis acid in combination with an amine as the endcapping catalyst (U.S. Pat. No. 4,515,932). This reaction does not exhibit a particularly high yield. For example, endcapping a silanol endstoppped (endcapped) polydimethylsiloxane using dimethyltetramethoxysilazane in the presence of di-n-hexylamine and various acids yields only about a 21% conversion to the desired methyldimethoxy endcap when the acid is formic acid. While higher molecular weight acids such as acetic acid will yield 100% of the desired methyldimethoxy endcap, the use of hydroxy or methanol scavengers becomes necessary for stability.

The use of dialkyl tin dicarboxylates as condensation cure catalysts for alkoxy functional one part room temperature vulcanizable silicone compositions is disclosed in several U.S. Pat. Nos. (4,593,085; 4,670,532; 4,755,578; 4,895,918; 4,505,209; 4,563,498; and 4,528,353). However, in order to obtain long term stability of the composition, i.e. shelf stability, the dialkyl tin dicarboxylate catalyzed compositions require the presence of amino silanes or silazanes as in-situ methanol scavengers. These scavengers are not without their own problems. For example, the reaction between methanol and hexamethyldisilazane results in the release of ammonia, which has an unpleasant odor and a corrosive effect, particularly on copper containing alloys such as brass.

SUMMARY OF THE INVENTION

The present invention provides for a colorless, translucent, shelf stable, fast curing one-part room temperature vulcanizable silicone composition consisting essentially of:

(a) 100 parts by weight of a polydimethylsiloxane having the formula:

$$(R^1O)_{3-a}-Si-(O-Si\underset{R}{\overset{R}{|}}O)_n-O-Si-(OR^1)_{3-a},$$
$$\overset{R^2_a}{|} \quad \overset{R^2_a}{|}$$

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, wherein said polydimethylsiloxane has a viscosity ranging from about 100 to about 500,000 centipoise (cps) at 25° C.;

(b) from about 5 to about 40 parts by weight per hundred parts by weight of polymer (a) of a fumed or pyrogenic silica reinforcing filler;

(c) from slightly greater than zero to about 5 parts by weight per hundred parts by weight of polymer (a) of a polyalkoxysilane crosslinking agent having the formula:

$$(R^1O)_{4-a}-Si-R^2_a,$$

where R and $R^2$ are as previously defined;

(d) from slightly greater than zero to about 2.0 parts by per hundred parts by weight of polymer (a) of an epoxy silane adhesion promoter having the formula:

$$(R^3O)_{3-b}-Si-R^5OR^6-CH\underset{O}{\overset{R^4_b \quad\quad\quad R^7}{\diagdown\diagup}}CH,$$

where $R^3$ and $R^4$ are independently selected one to eight carbon atom monovalent hydrocarbon radicals, $R^5$ and $R^6$ are independently selected two to twelve carbon atom divalent hydrocarbon radicals, $R^7$ is hydrogen or $R^1$, and b varies from 0 to 3; and (e) from about 0.10 to about 3.0 parts by weight per hundred parts by weight of polymer (a) of a titanium condensation cure catalyst having the formula: Ti(OR$^8$)$_4$, where $R^8$ is a one to ten carbon atom monovalent hydrocarbon radical, whereby said room temperature vulcanizable silicone composition is both translucent and non-corrosive.

The present invention further provides for a translucent and non-corrosive room temperature vulcanizable silicone composition additionally comprising from slightly greater than zero to about 50 parts by weight per hundred parts by weight of said polymer (a) of a tri-organosilyl endstopped polymer having the formula:

$$R^2{}_3-Si-(O-Si\underset{R}{\overset{R}{|}}O)_n-O-Si-R^2{}_3,$$

where R and $R^2$ are as previously defined, having a viscosity of from about 10 to about 5,000 cps at 25° C.

DETAILED DESCRIPTION OF THE INVENTION

Because metal chelates impart opacity and a yellow color to room temperature vulcanizable silicone compositions, they cannot be used to formulate colorless translucent room temperature vulcanizable compositions. While tetra-alkyl titanates, such as isopropyl titanate and tetra-n-butyl titanate, are excellent condensation cure catalysts for alkoxy room temperature vulcanizable silicone compositions because they are highly miscible in siloxanes, affording colorless sealants, they cannot be used in the same fashion as the dialkyl titanium chelates. Tetra-alkyl titanate compounds tend to preferentially crosslink through the silanols and the titanate. Thus in a reaction scheme where it is desired to catalyze an endcapping reaction between a silanol polymer and methyltrimethoxysilane gelation results. In order to avoid this side reaction when a tetra alkyl titanium catalyst is used, a pre-endcapped polylalkoxy polymer is mandatory.

We now disclose that use of a pre-endcapped alkyl dialkoxy terminated diorganopolysiloxane, a reinforcing fumed silica filler, a polyalkoxy crosslinking silane, and a tetra alkyl titanate condensation cure catalyst provides a translucent, shelf stable, non-corrosive sealant.

The translucent, non-corrosive sealants of the present invention are comprised of:

(a) pre-endcapped alkyl polyalkoxy terminated diorganopolysiloxane (as taught in U.S. Pat. Nos. 4,863,992 and 4,515,932) or pre-endcapped polyalkoxy terminated diorganopolysiloxane;

(b) a reinforcing fumed silica filler;

(c) a triorganosilyl endstoppped diorganopolysiloxane;

(d) a polyalkoxysilane crosslinking agent;

(e) an epoxysilane adhesion promoter;

(f) a tetra alkyl titanate condensation cure catalyst.

The compositions of the present invention comprise:

(a) 100 parts by weight of a pre-endcapped alkyl dialkoxy terminated polydimethylsiloxane having the formula:

$$(R^1O)_{3-a}-Si-(O-Si\underset{R}{\overset{R}{|}}O)_n-O-Si-(OR^1)_{3-a},$$
$$\overset{R^2_a}{|} \quad \overset{R^2_a}{|}$$

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, having a viscosity ranging from about 100 to about 500,000 centipoise (cps) at 25° C., preferably from about 5,000 to about 300,000 cps at 25° C. and most preferably from about 10,000 to about 150,000 cps at 25° C., wherein the terminal silicon atoms of the polymer possess at least two alkoxy groups;

(b) from about 5 to about 40 parts by weight, preferably from about 15 to 35 parts by weight and most preferably from about 20 to about 30 parts by weight per hundred parts by weight of polymer (a) of a fumed or pyrogenic silica reinforcing filler that is preferably treated;

(c) from zero to about 50 parts by weight, preferably from about 5 to about 30 parts by weight, and most preferably from about 10 to about 20 parts by weight per hundred parts by weight of polymer (a) of a tri-organosilyl endstopped polymer generally having the formula:

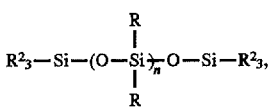

where R and $R^2$ are as previously defined, having a viscosity of from about 10 to about 5,000 cps at 25° C., more preferably from about 15 to 1,000 cps at 25° C. and most preferably from about 20 to about 200 cps at 25° C.;

(d) from slightly greater than zero to about 5 parts by weight, preferably from about 0.5 to about 3.5 parts by weight and most preferably from about 1.0 to about 2.5 parts by weight per hundred parts by weight of polymer (a) of a polyalkoxysilane crosslinking agent having the formula:

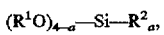

where R and $R^2$ are as previously defined;

(e) from slightly greater than zero to about 2.0 parts by weight, preferably from about 0.3 to about 1.5 parts by weight and most preferably from about 0.5 to about 1.0 parts by weight per hundred parts by weight of polymer (a) of an epoxy silane adhesion promoter having the formula:

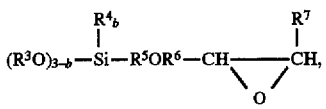

where $R^3$ and $R^4$ are independently selected one to eight carbon atom monovalent hydrocarbon radicals, $R^5$ and $R^6$ are independently selected two to twelve carbon atom divalent hydrocarbon radicals, $R^7$ is hydrogen or $R^1$, and b varies from 0 to 3; and (f) from about 0.10 to about 3.0 parts by weight, preferably from about 0.50 to about 2.0 parts by weight and most preferably from 0.8 to about 1.5 parts by weight per hundred parts by weight of polymer (a) of a titanium tetra-alkoxylate (or alternatively, a tetra alkyl titanate) condensation cure catalyst having the formula: $Ti(OR^8)_4$, where $R^8$ is a one to ten carbon atom monovalent hydrocarbon radical. Thus the composition ranges from a composition containing about 105.1 parts by weight to about 200 parts by weight of the components (a) through (f).

The non-corrosive properties of the compositions of the present invention are not obtained if methanol scavenger compounds are present. Thus the presence of amino silanes or silazane compounds would materially alter the non-corrosive aspects of the composition, because of the chemical reactions previously discussed.

While polymer (a) is generally an alkyl alkoxy endstopped diorganopolysiloxane there are specific substituents that are either preferred or simply are more convenient to use in preparing the compositions of the present invention. Thus while R1 may be selected from the group of one to eight carbon atom monovalent hydrocarbon radicals that includes alkyl radicals, alkyl ether radicals, alkylketone radicals, alkylcyano radicals and seven to thirteen carbon atom monovalent aralkyl radicals, simple alkyl radicals such as methyl, ethyl iso-propyl and n-propyl are preferred. Similar considerations obtain for the radicals R and $R^2$, where the one to fifteen carbon atom monovalent hydrocarbon radical may be selected from the group consisting of alkyl radicals, alkyl ether radicals, alkylketone radicals, alkylcyano radicals and seven to thirteen carbon atom monovalent aralkyl radicals which may be unsubstituted or where some of the hydrogen atoms of the radicals are substituted with halogens such as fluorine, chlorine, or bromine, simple alkyl radicals such as methyl, ethyl, iso-propyl and n-propyl are preferred.

The tri-organosilyl diorganopolysiloxane, component (c), functions as a plasticizer while the formula previously recited is the preferred formula, generally commercial preparations of such plasticizer compounds will be contaminated with low levels of silanol endstopped polymer. Thus there should be no more than about 500 ppm silanol groups present in the compound or mixture of compounds used as plasticizing agents.

The polyalkoxysilane crosslinking agent, component (d), while conforming to the previously recited formula is preferably selected from the group consisting of methyltrimethoxysilane, vinyltrimethoxysilane, tetramethoxysilane, methyltriethoxysilane, vinyltriethoxysilane, and tetraethoxysilane.

The epoxy silane adhesion promoter, component (e), while conforming to the previously recited formula is preferably selected from the group consisting of γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-glycidoxyethyltrimethoxysilane, and epoxycyclohexylethyltrimethoxysilane. The most preferred adhesion promoter is γ-glycidoxypropyltrimethoxysilane.

The tetra-alkyl titanate condensation cure catalyst while conforming to the formula previously recited is preferably selected from the group consisting of tetra-n-butyl titanate, tetra-isopropyl titanate, and tetra-(2-ethylhexyl) titanate.

It is within the scope of the present invention that while amino silane compounds and silazane compounds must be excluded from the composition in order to obtain the non-corrosive properties sought, additional corrosion inhibiting compounds may be added to the formulation. Preferred corrosion inhibiting compounds are selected from the group consisting of unsubstituted and substituted benzotriazoles.

All United States patents referenced herein are herewith and hereby incorporated by reference.

EXPERIMENTAL

Example 1

Example 1 illustrates the preparation of methyl dimethoxy terminated polydimethylsiloxane (polydimethylsiloxane) containing a hydroxy scavenger. Endcapped polydimethylsiloxane polymer was prepared by mixing the following ingredients in a 5 liter resin kettle equipped with an electrical heating mantle, mechanical agitator, and a dry nitrogen purge. The following ingredients were used: 100 parts by weight of hydroxy terminated polydimethylsiloxane polymer having a viscosity of 25,000 cps at 25° C.; 2.0 parts by weight methyltrimethoxysilane; 0.10 parts by weight di-n-butylamine; and 0.05 parts by weight acetic acid. The mixture was heated to 80° C. and mixed for 30 minutes whereupon 0.50 parts by weight hexamethyldisilazane was added. The resulting mixture was agitated for 30 minutes at 80° C. The agitation was discontinued and the mixture allowed to cool to room temperature. The resulting silicone polymer was found to be endcapped with methyl dimethoxy silyl groups by $Si^{29}$ Fourier transform nuclear magnetic resonance (FTNMR). The endcapped polymer had a viscosity of 26,750 cps at 25° C.

Example 2

Example 2 illustrates the preparation of scavenger free methyl dimethoxy terminated polydimethylsiloxane polymer. This polymer was prepared by mixing the following ingredients under anhydrous conditions: 100 parts by weight of hydroxy terminated polydimethylsiloxane polymer having a viscosity of 25,000 cps at 25° C.; 2.0 parts by weight methyltrimethoxysilane; 0.03 parts by weight di-n-butylamine; and 0.01 parts by weight formic acid. The reaction mixture was heated for 60 minutes at 80° C. and then 2 hours at 120° C. The mixture was then cooled to room temperature. The resulting silicone polymer was found to be 100% endcapped with methyl dimethoxy silyl groups by $Si^{29}$ FTNMR. The resulting polymer had a viscosity of 27,435 cps at 25° C.

Example 3

Example 3 describes the continuous preparation of a scavenger containing room temperature vulcanizable silicone sealant using a 30 mm Werner-Pfleiderer twin screw extruder. This example illustrates the lack of cure that results from the use of a tetra alkyl titanate condensation catalyst in the presence of the hexamethyldisilazane stabilized polymer of example 1.

All sections of the extruder were heated to 75° C. 19 parts by weight of a fumed silica filler that had been treated with octamethylcyclotetrasiloxane and hexamethyldisilazane and 68.75 parts by weight of the methyldimethoxy terminated polymer of example were continuously added to barrel 1. 10.0 parts by weight of a trimethylsilyl terminated polydimethylsiloxane fluid having a viscosity of 100 cps at 25° C. was continuously added to barrel 8. A de-airing vacuum was applied at barrel 11. 1.0 parts by weight methyltrimethoxysilane and 0.75 parts by weight tetra-isopropyl titanate was continuously added at barrel 13. The sealant was produced at a rate of 40 pounds per hour. The sealant so produced failed to cure after 7 days exposure to 72° F. and 50% relative humidity (standard curing conditions).

Example 4

Example 3 was repeated substituting 0.25 dibutyltin diacetate as the condensation cure catalyst. The sealant composition was cured for 7 days at the standard conditions. The ASTM physical properties of the sealant were then measured (Table 1).

Corrosion testing on copper and brass was conducted on the sealant by extruding a known weight of the silicone composition into a test jar, covering the silicone with water and suspending corrosion test coupons of brass and copper in the water that was in contact with the silicone. The procedure was repeated without the silicone as a control. The jars were maintained at 100°±3.6° F. for a period of 168±4 hours (7 days). Silicone samples that discolor or corrode the test coupons are considered to have failed the test. A similar test involves testing copper wire that is encapsulated in the test silicone curing the encapsulated wire for 168±4 hours at 50±5% relative humidity at 23° C. and aging the encapsulated wire at 120°±2° F. in 95–98% relative humidity for 28 days. Any showing of corrosion relative to a control indicates failure. Test results are presented in Table 1.

Example 4 illustrates the corrosive nature of room temperature vulcanizable sealants that contain scavengers such a hexamethyldisilazane that decompose to form ammonia as a product.

Example 5

Example 5 describes the continuous preparation of a scavenger free room temperature vulcanizable silicone sealant composition containing a tetravalent tin condensation cure catalyst using a 30 mm Werner-Pfleiderer twin screw extruder. This example demonstrates the lack of shelf stability that results from the absence of a disilazane scavenger in the presence of a dialkyltin dicarboxylate.

All sections of the extruder were heated to 75° C. 19 parts by weight of a fumed silica filler that had been treated with octamethylcyclotetrasiloxane and hexamethyldisilazane and 68.75 parts by weight of the methyldimethoxy terminated polymer of example were continuously added to barrel 1. 10.0 parts by weight of a trimethylsilyl terminated polydimethylsiloxane fluid having a viscosity of 100 cps at 25° C. was continuously added to barrel 8. A de-airing vacuum was applied at barrel 11. 1.0 parts by weight methyltrimethoxysilane and 0.24 parts by weight dibutyl tin diacetate was continuously added at barrel 13. The sealant was produced at a rate of 40 pounds per hour.

The sealant composition was cured for 7 days at standard curing conditions. The ASTM physical properties of the sealant were then measured (Table 1). Properties upon accelerated aging were measured on cured samples after heating the uncured sealant in a sealed container for 5 days at 70° C. (Table 1).

Example 5 illustrates the unstable nature of alkoxy stopped room temperature vulcanizable sealants containing $Sn^{+4}$ condensation cure catalysts that do not contain hexamethyldisilazane.

Example 6

Example 5 was repeated substituting 0.75 parts by weight tetra isopropyl titanate for the dibutyl tin diacetate as the condensation cure catalyst. The sealant composition was cured for 7 days at standard conditions. The ASTM physical properties of the sealant were then measured (Table 1). Properties upon accelerated aging were measured on cured samples after heating the uncured sealant in a sealed container for 5 days at 70° C. (Table 1). Corrosion testing was conducted on copper and brass (Table 1).

This example demonstrates that scavenger free methyldimethoxy stopped polydimethylsiloxane polymer, in combination with a tetra alkyl titanate cure catalyst yields a room temperature vulcanizable composition that is colorless, translucent, fast curing, shelf stable and non-corrosive to copper and brass.

Example 7

Example 6 was repeated substituting 0.75 parts by weight tetra n-butyl titanate for the tetra isopropyl titanate. This example demonstrates that scavenger free methyldimethoxy stopped polydimethylsiloxane polymer, in combination with a tetra alkyl titanate cure catalyst yields a room temperature vulcanizable composition that is colorless, translucent, fast curing, shelf stable and non-corrosive to copper and brass (Table 1).

Example 8

Example 6 was repeated substituting 0.50 parts by weight di-isopropoxy titanium bis-acetylacetonate for tetra isopropyl titanate as the cure catalyst. As shown in Table 1, while the resulting sealant is shelf stable, the sealant discolors and corrodes copper and brass. Example 8 illustrates the fact that condensation cure catalysts that contain metal chelating agents such as acetylacetone cannot be used in non-corrosive room temperature vulcanizable silicone sealant compositions.

Example 9

Example 6 was repeated substituting 0.50 parts by weight di-isopropxytitanium bis-ethylacetoacetate for tetra isopropyl titanate as the condensation cure catalyst. As shown in Table 1, the resulting sealant composition is non-corrosive to copper and brass, but was yellow and hazy in appearance.

Example 10

Example 6 was repeated substituting 0.25 parts by weight dibutyltin bis-acetylacetonate for tetra isopropyl titanate as the condensation cure catalyst. As shown in Table 1, the resulting sealant composition is corrosive to copper and brass.

Example 11

Example 6 was repeated substituting 0.25 parts by weight dibutyltin bis-ethylacetoacetate as the condensation cure catalyst. As shown in Table 1 the resulting composition is not shelf stable.

TABLE 1

Silicone Sealant Compositions Tested to Result in Translucent and Non-Corrosive RTV Sealant Compositions

| Example No. | 3 | 4 | 5 | 6 | 7 | 8 | 9 | 10 | 11 |
|---|---|---|---|---|---|---|---|---|---|
| Appearance | colorless translucent | colorless translucent | colorless translucent | colorless translucent | colorless translucent | yellow hazy | yellow hazy | colorless translucent | colorless translucent |
| Tack Free time, hr. | No cure | 20 min. | 20 min. | 3 hours | 8 hours | 3 hours | 5 hours | 30 min. | 60 min. |
| 24 hr. Cure through, in. | No cure | 0.125 | 0.125 | 0.125 | 0.125 | 0.125 | 0.125 | 0.125 | 0.125 |
| Room Temp. 7 day cure | | | | | | | | | |
| Shore A | No Cure | 32 | 34 | 34 | 36 | 33 | 37 | 35 | 36 |
| Tensile, psi | | 525 | 515 | 540 | 560 | 500 | 540 | 560 | 520 |
| Elongation, % | | 535 | 545 | 520 | 515 | 485 | 555 | 520 | 545 |
| Aging,* 7 Day Cure | | | | | | | | | |
| Shore A | No Cure | 28 | No Cure | 31 | 29 | 26 | 32 | 34 | No Cure |
| Tensile, psi | | 465 | | 495 | 505 | 475 | 515 | 550 | |
| Elongation, % | | 495 | | 505 | 485 | 470 | 535 | 535 | |
| Coupon Corrosion | Fail | Fail | Pass | Pass | Pass | Fail | Pass | Fail | Pass |
| Cu Wire Corrosion | Fail | Fail | Pass | Pass | Pass | Fail | Pass | Fail | Pass |

Notes:
*Accelerated aging under sealed conditions at elevated temperature followed by curing for 7 days.

These results indicate that in order to achieve a non-corrosive room temperature vulcanizable silicone composition, components that do not degrade to either acids or bases are necessary. Thus the elimination of scavenger compounds that form ammonia, a corrosive base, is necessary as is the elimination of condensation cure catalysts that degrade to form corrosive acidic compounds, e.g. acetylacetonates. In order to develop a room temperature vulcanizable silicone composition that is non-corrosive, the elimination of scavenger compounds and acidic type condensation cure catalysts constrains the composition of the crosslinkable silicone polymers to particularly specific forms.

Having described the invention that which is claimed is:

1. A room temperature vulcanizable silicone composition consisting of:
   (a) 100 parts by weight of a polydimethylsiloxane having the formula:

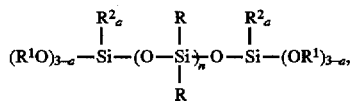

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, wherein said polydimethylsiloxane has a viscosity ranging from about 100 to about 500,000 centipoise (cps) at 25° C.;

(b) from about 5 to about 40 parts by weight per hundred parts by weight of polymer (a) of a fumed or pyrogenic silica reinforcing filler;
   (c) from slightly greater than zero to about 5 parts by weight per hundred parts by weight of polymer (a) of a polyalkoxysilane crosslinking agent having the formula:

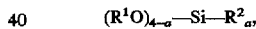

where R and $R^2$ are as previously defined;

(d) from slightly greater than zero to about 2.0 parts by per hundred parts by weight of polymer (a) of an epoxy silane adhesion promoter having the formula:

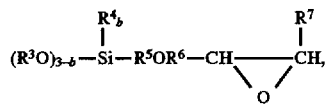

where $R^3$ and $R^4$ are independently selected one to eight carbon atom monovalent hydrocarbon radicals, $R^5$ and $R^6$ are independently selected two to twelve carbon atom divalent hydrocarbon radicals, $R^7$ is hydrogen or $R^1$, and b varies from 0 to 3; and (e) from about 0.10 to about 3.0 parts by weight per hundred parts by weight of polymer (a) of a titanium condensation cure catalyst having the formula: $Ti(OR^8)_4$, where $R^8$ is a one to ten carbon atom monovalent hydrocarbon radical, whereby said room temperature vulcanizable silicone composition is both translucent and non-corrosive.

2. A room temperature vulcanizable silicone composition consisting of:
   (a) 100 parts by weight of a polydimethylsiloxane having the formula:

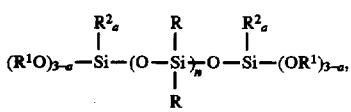

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, wherein said polydimethylsiloxane has a viscosity ranging from about 100 to about 500,000 centipoise (cps) at 25° C.;

(b) from about 5 to about 40 parts by weight per hundred parts by weight of polymer (a) of a fumed or pyrogenic silica reinforcing filler;

(c) from slightly greater than zero to about 50 parts by weight per hundred parts by weight of said polymer (a) of a tri-organosilyl endstopped polymer having the formula:

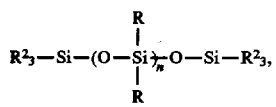

where R and $R^2$ are as previously defined, having a viscosity of from about 10 to about 5,000 cps at 25° C.;

(d) from slightly greater than zero to about 5 parts by weight per hundred parts by weight of polymer (a) of a polyalkoxysilane crosslinking agent having the formula:

where R and $R^2$ are as previously defined;

(e) from slightly greater than zero to about 2.0 parts by per hundred parts by weight of polymer (a) of an epoxy silane adhesion promoter having the formula:

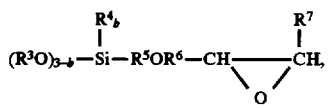

where $R^3$ and $R^4$ are independently selected one to eight carbon atom monovalent hydrocarbon radicals, $R^5$ and $R^6$ are independently selected two to twelve carbon atom divalent hydrocarbon radicals, $R^7$ is hydrogen or $R^1$, and b varies from 0 to 3; and (f) from about 0.10 to about 3.0 parts by weight per hundred parts by weight of polymer (a) of a titanium condensation cure catalyst having the formula: $Ti(OR^8)_4$, where $R^8$ is a one to ten carbon atom monovalent hydrocarbon radical, whereby said room temperature vulcanizable silicone composition is both translucent and non-corrosive.

3. The composition of claim 2 wherein R, $R^1$ and $R^2$ are each independently selected from the group consisting of methyl, ethyl, iso-propyl and n-propyl.

4. The composition of claim 3 wherein the polyalkoxysilane crosslinking agent is selected from the group consisting of methyltrimethoxysilane, vinyltrimethoxysilane, tetramethoxysilane, methyltriethoxysilane, vinyltriethoxysilane, and tetraethoxysilane.

5. The composition of claim 4 wherein the epoxy silane adhesion promoter is selected from the group consisting of γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-glycidoxyethyltrimethoxysilane, and epoxycyclohexylethyltrimethoxysilane.

6. The composition of claim 5 wherein the titanium condensation cure catalyst is selected from the group consisting of tetra-n-butyl titanate, tetra-isopropyl titanate, and tetra-(2-ethylhexyl) titanate.

7. The composition of claim 6 wherein the polyalkoxysilane crosslinking agent is methyltrimethoxysilane.

8. The composition of claim 7 wherein the epoxy silane adhesion promoter is γ-glycidoxypropyltrimethoxysilane.

9. A room temperature vulcanizable silicone composition consisting of:

(a) 100 parts by weight of a polydimethylsiloxane having the formula:

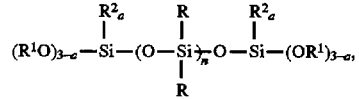

where each R and $R^2$ is independently a substituted or unsubstituted one to fifteen carbon atom monovalent hydrocarbon radical $R^1$ is a one to eight carbon atom monovalent hydrocarbon radical or a seven to thirteen carbon atom monovalent aralkyl radical n is a number ranging from about 50 to about 2,500 and a is zero or one, wherein said polydimethylsiloxane has a viscosity ranging from about 100 to about 500,000 centipoise (cps) at 25° C.;

(b) from about 5 to about 40 parts by weight per hundred parts by weight of polymer (a) of a fumed or pyrogenic silica reinforcing filler;

(c) from slightly greater than zero to about 5 parts by weight per hundred parts by weight of polymer (a) of a polyalkoxysilane crosslinking agent having the formula:

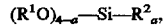

where R and $R^2$ are as previously defined;

(d) from slightly greater than zero to about 2.0 parts by per hundred parts by weight of polymer (a) of an epoxy silane adhesion promoter having the formula:

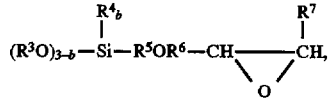

where $R^3$ and $R^4$ are independently selected one to eight carbon atom monovalent hydrocarbon radicals, $R^5$ and $R^6$ are independently selected two to twelve carbon atom divalent hydrocarbon radicals, $R^7$ is hydrogen or $R^1$, and b varies from 0 to 3; and (e) from about 0.10 to about 3.0 parts by weight per hundred parts by weight of polymer (a) of a titanium condensation cure catalyst having the formula: $Ti(OR^8)_4$, where $R^8$ is a one to ten carbon atom monovalent hydrocarbon radical, whereby said room temperature vulcanizable silicone composition is both translucent and non-corrosive to copper and brass.

* * * * *